US 6,609,137 B2

(12) United States Patent
Owen, Jr.

(10) Patent No.: US 6,609,137 B2
(45) Date of Patent: Aug. 19, 2003

(54) METHODS AND SYSTEMS FOR CONFIRMING THE TIMELY RECEIPT AND PROCESSING OF DATA FILES

(75) Inventor: Eugene Owen, Jr., Alabaster, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 284 days.

(21) Appl. No.: 09/727,818

(22) Filed: Dec. 1, 2000

(65) Prior Publication Data

US 2002/0103808 A1 Aug. 1, 2002

(51) Int. Cl.$^7$ .............................................. G06F 17/30
(52) U.S. Cl. ....................................................... 707/203
(58) Field of Search ................................ 707/200, 201, 707/202, 203, 204, 205, 10, 8; 714/20, 26; 705/75, 80, 34

(56) References Cited

U.S. PATENT DOCUMENTS

| 5,608,874 | A | | 3/1997 | Ogawa et al. | |
|---|---|---|---|---|---|
| 5,933,594 | A | * | 8/1999 | La Joie et al. | 714/26 |
| 6,023,705 | A | * | 2/2000 | Bellinger et al. | 707/200 |
| 6,088,693 | A | * | 7/2000 | Van Huben et al. | 707/8 |
| 6,094,654 | A | * | 7/2000 | Van Huben et al. | 707/8 |

OTHER PUBLICATIONS

Panek, J.W.; discloses verifying data integrity of electronically scanned pressure systems at the NASA Glenn Research Center Instrumentation in Aerospace Simulation Facilities, 2001. 19th International Congress on ICIASF 2001, Aug.; pp. 320–332.*

* cited by examiner

Primary Examiner—Diane D. Mizrahi
(74) Attorney, Agent, or Firm—Cantor Colburn LLP

(57) ABSTRACT

The mechanism provides for a method and system of verifying that data files have been timely received from an data file originator and processed by a processing entity. A data file originator sends a processing entity data files that must be processed by a specified time and in a specified order. The mechanism provides that when a data file is processed by the processing entity, a confirmation record is created verifying that a given originator's data file has been processed. At a preset time, prior to the time the originator has specified for the data file to be processed, the processing entity performs a confirmation test. The confirmation test is used to confirm that originator's data files have been processed in the order specified by the originator. The confirmation test involves comparing the contents of confirmation records. If it is determined by the confirmation test that the originator's data files were not processed in the proper sequence and at the specified time, an error message is generated and routed to the processing entity's system operator. The error message routed to the processing entity's system operator, preferably contains comprehensive information regarding the nature of the error.

29 Claims, 3 Drawing Sheets

METHODS AND SYSTEMS FOR CONFIRMING THE TIMELY RECEIPT AND PROCESSING OF DATA FILES

FIELD OF INVENTION

The present invention relates to methods and systems for processing data files. Embodiments of the present invention provide for confirming that transferred data files have been timely received and processed.

BACKGROUND

A large number of companies provide services to millions of customers and find the tasks associated with billing customers time consuming and costly. These service providers often find it more economical and efficient to outsource to other entities the administrative tasks of processing billing data. These administrative tasks include processing bills and mailing bills to customers.

Generally, service providers place a great deal of pressure on bill processing entities to process billing data files. Often, service providers inform the bill processing entity when the service provider will transmit billing data and when the service provider expects the billing data to be processed. It is conceivable that a service provider will dictate that bills be processed in as little a twenty-four (24) hours or less. The turnaround time for processing bills is important because any delays in processing bills often delays the service provider's receipt of payment from its customers. To compensate for such delay, many service providers charge bill processing entities costly late fees for failing to meet data processing demands.

In many instances, bills are processed with little or no problems. Service providers simply electronically submit billing data to a chosen processing entity and the billing data is timely received and processed. There are occasions, however, when errors occur in the electronic transmission of billing data, when a service provider neglects to transmit billing data or when the processing entity neglects to process billing data that has been transmitted. When these types of errors occur, either no billing data is processed or previously transmitted data is re-processed by the processing entity. Consequently, errors in receiving or processing billing data can result in wasted time and resources.

In conventional systems, errors are generally problematic because the processing entity is unaware of the errors in receiving or processing billing data until well after the error has occurred. Often, in conventional systems, when the service provider is informed of the error, it is too late to both rectify the problem, re-transmit the billing data and process the billing data in the time agreed upon by the processing entity. This delay in notification of errors can be costly especially for processing entities who are assessed a penalty fee for failing to timely process billing data. Moreover, failing to process billing data as agreed may lessen service providers' confidence in individual processing entities, thereby harming the goodwill of the processing entity.

It would be advantageous if errors could be detected and the processing entity notified of the errors immediately so that there would be sufficient time to rectify the problem and meet the data processing deadline.

SUMMARY OF INVENTION

The present invention provides methods and systems that meet the aforementioned needs and provide advantages over current systems.

In one aspect, the present invention comprises a method for providing real-time notification that an error has occurred in receiving or processing transmitted billing data files. The method may be advantageously utilized by service providers and bill processing entities. In an embodiment of the invention, a service provider is the originator of a billing data file. The service provider (hereinafter "originator") and a processing entity reach an agreement regarding the frequency with which the originator will transmit billing data files and the frequency with which the processing entity will process the billing data files.

Before the originator transmits any data files to the processing entity, the processing entity, using the terms of the agreement, develops a profile for the originator. Many processing entities will handle billing data files for multiple service providers. In embodiments of the present invention, a separate unique profile is developed for each service provider. The profile includes one or more of the following types of information: a unique means to identify each originator, each originator's name, address, phone number, the frequency with which billing data is to be transmitted from the originator and the frequency with which data is to be processed by the processing entity. Preferably, the unique means to identify the originator comprises a randomly-generated numeric code. Of course, the originator's profile may include other identifying attributes about the originator.

In an embodiment of the invention, once the processing entity has developed the originator's profile, the originator begins to electronically submit billing data files to the processing entity. The billing data files transmitted by the originator include the originator's unique means of identification. The originator's unique means of identification transmitted with the originator's billing data file is the same as the unique means of identification stored in the originator's profile. The billing data files may further comprise billing information relating to the originator's customers and/or a means to determine the order in which the originator wants its billing data files processed.

Determination of the order in which the originator wants its billing data file processed may be accomplished by including a sequence number with each data file as it is generated and before it is submitted to the processing entity for processing. The originator may set an initial sequence number and increment by one (1) the sequence number of each data file it generates. The originator billing data file would, therefore, contain the originator's unique numerical identification code and the billing data file's sequence number.

Once the billing data file is received from the originator by the processing entity, the billing data file may be stored in the processing entity's system. In an embodiment of the present invention, processing of the billing data file occurs at a preset time based on factors important to the originator or processing entity. At the preset time, a data processor residing on the processing entity's host computer scans for billing data files submitted by an originator. The data processor may comprise any device or software application with the ability to process data files according to the originator's specifications. The preset time in which the data processor scans the processing entity's host computer is sometime after the billing data file is scheduled to be transferred from the originator to the processing entity. To obtain the preset time to process the billing data files of a specific originator, the processing entity may refer to the information contained in the originator's profile.

After the billing data file is processed by the processing entity's data processor, the data processor creates a confirmation record to confirm that the data file was processed. The confirmation record contains information about the data file just processed. In one aspect of the invention, the confirmation record consists of the originator's unique identification code, the sequence number of the billing data file and the date the billing data file was processed.

According to the invention, the processing entity uses confirmation records in a confirmation test to determine whether the processing entity has received billing data files from the originator and processed them. At a second preset time, the two most recently created confirmation records for a respective originator are retrieved by a confirmation device. The confirmation device may comprise any device or software application with the ability to locate and extract data files based on a set of parameters. The contents of the retrieved confirmation records are compared by the confirmation device to determine if a data file was overlooked by the data processor or if a data file was not received from the service provider. In one aspect of the invention, the confirmation test involves comparing the sequence numbers of the retrieved confirmation records and comparing the date of the most recently created confirmation record with the date the data files was scheduled to be processed.

If the confirmation test fails, i.e. the billing data files were processed out of sequence or the data file was not processed on schedule, the system operator is notified that an error has occurred. The system operator may be notified by any error notification device capable of communicating information regarding the error. Preferably, the notification device communicates the error to the processing entity immediately after the error is detected. A variety of communication devices, used alone or in combination, can provide the type of real-time notification preferred in embodiments of the invention. These devices include, but are not limited to, a computer using an electronic messaging system, a telephone, both conventional and wireless, and a pager. Regardless of the error notification device, it is preferable that it have the ability to allow the operator to acknowledge receipt of the error message. It is further preferred that the error notification device have the ability to provide the system operator with, not only the name of the originator, but also the contents of the two confirmation records involved in the failed confirmation test. The contents of the confirmation records will likely provide the most valuable information to the system operator by giving the system operator an idea of the cause of the error.

A system of the present invention comprises computer hardware and software capable of performing a method of the present invention. In general, such hardware will include micro processors, memory, display devices, interface devices, cables and the like. The software will include operating systems and programs.

The microprocessor in a system of the present invention may comprise the central processing unit of a computer, e.g. an Intel, Motorola, IBM or AMD microprocessor. The message router may be implemented utilizing software or hardware. Commercially available software for routing messages includes software from Microsoft, Oracle and others.

A system of the present invention may be implemented as a "virtual" system, for example as a site on a computer network such as the world wide web; a corporate intranet; a government/military network or the like. Currently available hardware platforms, including PC's, Minicomputers and mainframes, and currently available operating systems, including UNIX, MS Windows, Mac OS and Linux, may be utilized.

One advantage of this invention is that the processing entity is made aware of errors more quickly than with conventional systems. In one aspect of the invention, the processing entity is also given information to identify the source of the error. No matter the error notification device used, real-time notification allows the processing entity more time to identify the nature of the error and correct it, while still leaving time to process the data in the time specified in the agreement between the originator and the processing entity.

It is a further advantage of this invention that the processing entity may maintain credibility with originators by fulfilling its promises to process the billing data as dictated by the agreement.

It is yet another advantage of this invention that the need for a processing entity to make economic concessions to originators for missed deadlines caused by unknown error is reduced.

DETAILED DESCRIPTION

Figure 1:
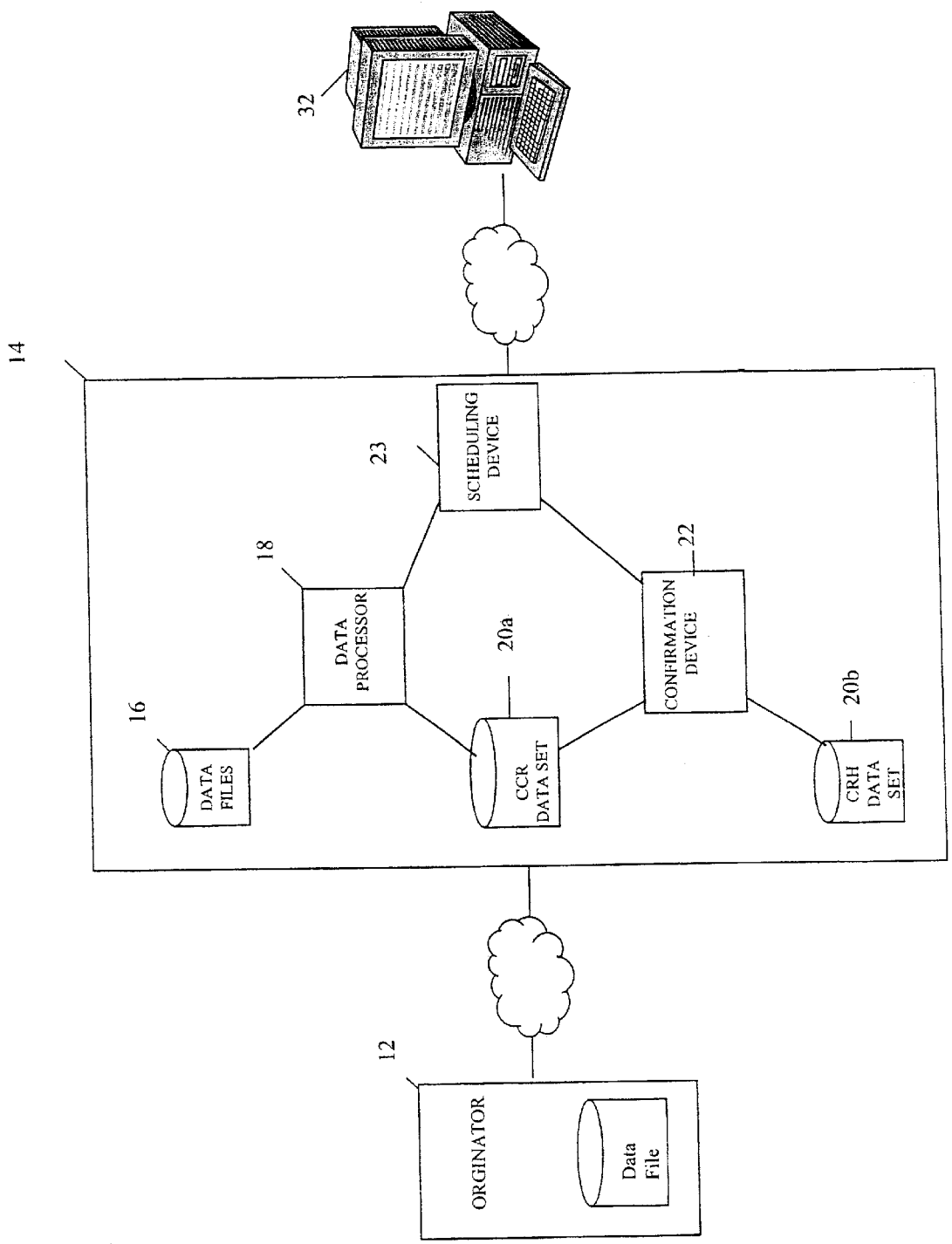
FIG. 1 shows an embodiment of the system.

The present invention is directed to methods and systems for confirming the receipt and processing of data files. The particular embodiments described herein are intended in all respects to be illustrative rather than restrictive. Alternative embodiments will become apparent to those skilled in the art to which the present invention pertains without departing from its spirit and scope.

Overview of the Invention

An aspect of the present invention provides for methods and systems of verifying that data files have been timely received from an originator and processed by a processing entity comprising: sending a confirmation record to the processing entity verifying that a given originator's data file has been processed; performing a confirmation test to confirm that an originator's data files have been processed in the order specified by the originator, wherein the confirmation test comprises comparing the contents of at least two confirmation records that confirm that the originator's data files were processed; generating an error message immediately following a failed confirmation test; and routing the error message to an error notification device accessible to an error identifier.

In an embodiment of this invention, the originator is the entity that generates the data file. However, the originator may merely be the entity that transmits the data file to the processing entity on behalf of another entity. The confirmation test confirms that a data file has been timely processed in the correct sequence. If the confirmation test fails, an aspect of the invention calls for immediately triggering an error notification device to communicate an error message to a processing system operator.

In an embodiment of the invention, the data file discussed above comprises: a sequence element to identify the sequence in which data files were generated by the originator, and an originator identification element to identify the originator of said data files. In a preferred embodiment of the invention, the sequence element is a sequence number that accompanies the data file and is incremented each time a data file is generated. In addition, the originator identification element is a pre-assigned unique identification code assigned to each data file originator.

In an embodiment of the invention, after each data file is processed, a confirmation record is created. The confirmation record comprises a sequence element to identify the sequence in which the processed data file was generated by the originator; an originator identification element to identify the originator of said data files; and the date the data file is processed.

In one aspect of the invention, the confirmation test comprises comparing the sequence element of at least the two most recently created confirmation records confirming that a specific originator's data files were processed and comparing the date of the most recently created confirmation record with the date the originator has specified that a data file should be processed. If the sequence element of the most recently created confirmation record is one (1) increment greater than the sequence element of the other confirmation record, the test is successful and the data files were processed in the correct order.

In an embodiment of the invention, the confirmation test further comprises comparing the date of the most recently created confirmation record with the date the data file is scheduled to be processed. If the date of the most recently created confirmation record is not the date the data file is scheduled to be processed the comparison test fails.

In one aspect of the invention, when the confirmation test fails an error has occurred and an error message must be communicated to an error identifier. In an embodiment of the invention the error identifier is the processing entity's system operator. A variety of error notification devices may be used to communicate the error message. In the preferred embodiment of this invention, the error notification device is an computer using an electronic messaging system.

The contents of the error message may vary depending on the needs and desires of the processing entity. In the preferred embodiment of the invention, the error message comprises the name of the originator and the information used in the confirmation test, i.e. the contents of the two most recently created confirmation records.

Further details of the steps of the present invention are described below with reference to the appended figures.

Overview of an Embodiment

Generally, the present invention relates to methods and systems for confirming the receipt and processing of data files within a specified time period. FIG. 1 is a block diagram that shows an embodiment of the present invention. Data files 12 are generated by a data file originator (hereinafter "originator") 10. In the preferred embodiment, data files 12 contain billing data. Nonetheless, as will become apparent, the method and system described herein can be adapted for use with any type of data file. An originator 10 may be any entity in need of a reliable means to timely process data files. Examples of entities that can take advantage of the present invention include utility companies, telecommunications companies, communication service providers, retail institution, and credit organization.

Once data files 12 are generated, they are routed to a processing entity's processing system using an appropriate network connected to the processing entity's system. A processing entity can be any organization having the capacity to implement and maintain the systems and methods described in this invention. In the embodiment described herein, the processing entity is a local telephone company.

The preferred embodiment of this invention contemplates that the processing entity and the originator 10 are separate and distinct entities with similar customers such as a long distance carrier and a local telephone service provider. It is, however, conceivable that the processing entity and the originator 10 are merely different departments or divisions within the same company. It is further conceivable that the processing entity and the originator will be wholly unrelated entities.

The processing entity is responsible for timely processing data files. To accomplish this, the processing entity's system 14 includes a mainframe or equivalent data storage and retrieval device used to store data files. The mainframe 14 stores data files submitted by originators 16 until they are retrieved and processed as will be further described below. Information stored on the mainframe 14 is stored in groups of data sets. For example, when data files 12 are received by the mainframe 14 from originators 10, the data files 12 are stored in a data files data set 16.

FIG. 1 also shows a scheduling device 23. The scheduling device 23 is a utility that allows the user to set the time to initiate certain actions that occur on the mainframe 14. For instance, the scheduling device 23 in the preferred embodiment of this invention, is preset to initiate the processor 18 and the confirmation device 22 to perform processing and confirmation activities.

The processor 18 shown in FIG. 1 is responsible for processing data files according to an originator's specification. At a preset time, the scheduling device 23 triggers the processor 18 to scan the mainframe 14 for data files 16. After processing the data file of an originator, the processor 18 creates a current confirmation record (hereinafter "CCR") and stores it in the CCR data set 20a. The CCR contains identifying information about each data file processed.

FIG. 1 further shows a confirmation record history (hereinafter "CRH") data set 20b. The CRH data set 20b contains confirmation records previously stored in the CCR data set 20a. Each time a new data file is processed, the confirmation records of a given originator stored in the CCR data set 20a are transferred to the CRH data set 20b.

At a preset time the scheduling device 23 triggers the confirmation device 22 to perform a confirmation test to determine whether data files were received and timely processed. The confirmation device 22 can be any device capable of performing a confirmation test using specific parameters provided by the processing entity. One such device is commonly known as UNITECH. UNITECH is conventionally used as an accounting and reconciliation tool. An embodiment of the invention manipulates UNITECH to perform the function of a confirmation device. The functions of the confirmation device 22 are further described below.

If the confirmation device 22 concludes that an error has occurred in the receipt and processing of a data file, the confirmation device 22 adds creates an error message. The error message is then routed through the appropriate network to communicate an error notification device 32 to notify the processing entity's system operator of the error. The preferred error notification device is a computer 32 using an electronic messaging system. However, any error notification device 32 may be used that has the capacity to notify a system operator that an error has occurred. Possible other error notifications devices include but are not limited to, conventional and wireless telephones, numeric and alphanumeric pager and other telecommunications devices.

Method of Operation for an Embodiment of the Invention

Figure 2:
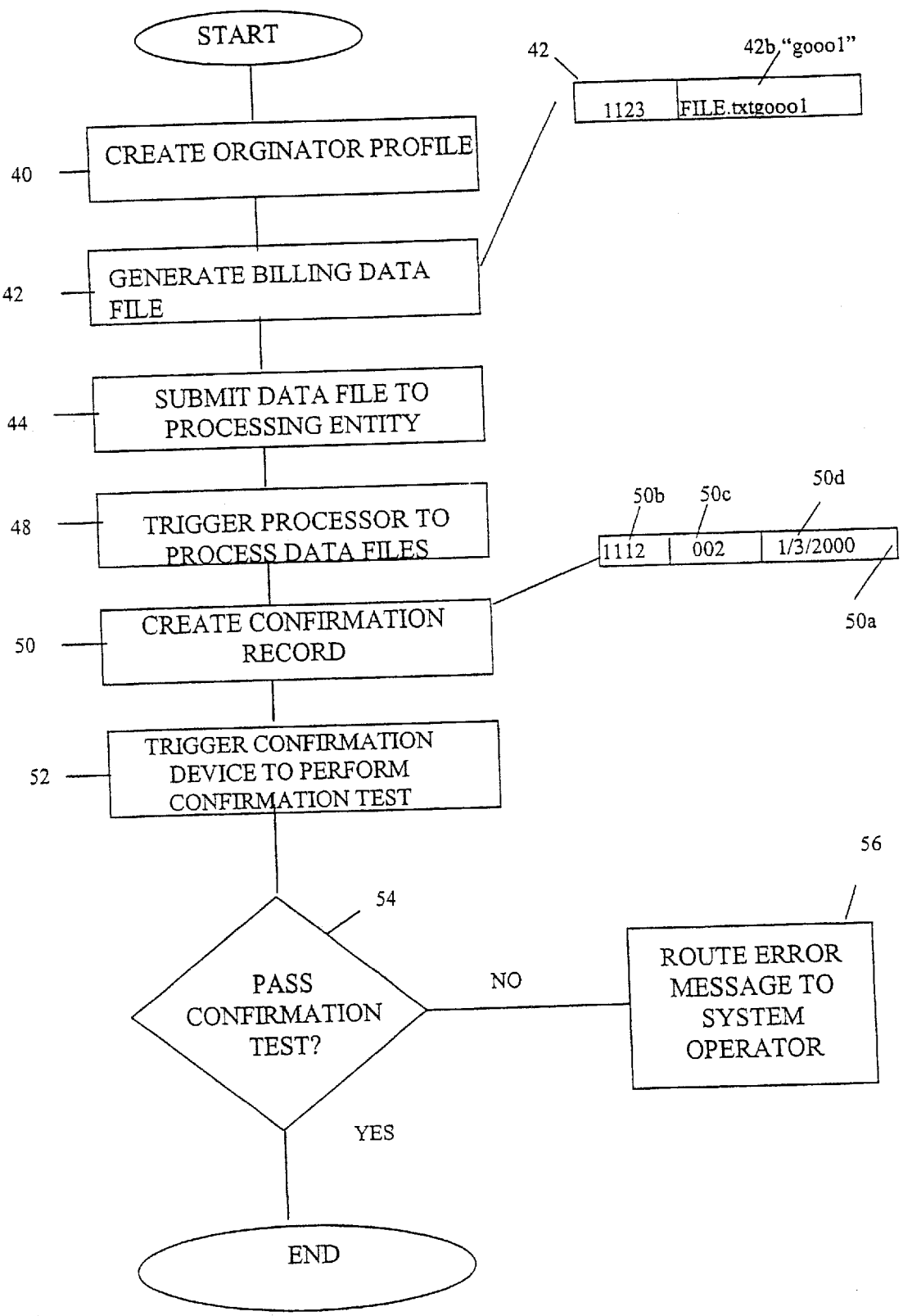
FIG. 2 is a flow diagram illustrating a method of operation of the present invention.

FIG. 2 is a flow diagram illustrating a method of operation of the present invention. In an embodiment of the invention, prior to any data files being submitted to the processing entity for processing, the processing entity creates an originator profile 40. The profile 40 includes information about each originator and is used to identify each originator and the attributes of each originator's data files. For example, an originator profile may include, 1) the originator's name, 2) address, 3) telephone number, 4) a unique means to identify each originator, 5) the frequency with which the originator's data files should be processed, and 6) the frequency with which the originator will submit data files to the processing entity. The unique means to identify the originator preferably comprises a randomly generated numerical code assigned to each originator by the processing entity. As will be appreciated later, the originator's identification code is used by the confirmation device to locate data files and confirmation records belonging to individual originators.

In this embodiment of the present invention, the data file generated by the originator 42 is a Generation Data Group (hereinafter "GDG") based file. The GDG based data file contains the originator's identification code, 42a and a sequence number 42b for each generation of a respective originator's data file. As shown in FIG. 2, the sequence number 42b is appended to the data file as "GXXX". The prefix "G" means "generation" and the "XXX" represents the order in which the data file was generated by a respective originator in relation to other data files generated by the originator.

For example, if the first data file has a sequence number 42b of "G001" then the next data file's sequence number 42b will be "G002" then "G003" and so on. In an embodiment of the invention, it is further possible for sequence numbers to continue in a cycle instead of continuing infinitely. For example, a series of sequence numbers 42b may recycle after reaching a maximum number. Assuming, that the maximum sequence number in a series is ninety-nine (99), the one hundredth (100th) data file generated will begin a new cycle having a sequence number of one (1) or G001 instead of incrementing the sequence number to one hundred (100) or G100.

Once the originator generates a data file 42, the originator routes the data file 44 to the processing entity. Preferably, data files are electronically routed to the processing entity. As shown in FIG. 1 the transmitted data file is stored on the mainframe 14 in a data file data set 16. Returning to FIG. 2, at a preset time, after the processing entity receives and stores the data file, the processing entity's data processor processes the data file 48 according to the originator's specifications. As shown in FIG. 1 the scheduling device 23 triggers the processor 18 at the preset time to retrieve and process data files 12 from the data file data set 16.

The preset time at which the processor 16 is triggered by the scheduling devices 23 is determined by reviewing the originator's profile 40. As previously described, the originator's profile includes the frequency in which a given originator will route data files to the processing entity and when the originator expects the files to be processed. The preset time is at some point after the data file is scheduled to be routed and before the data file is scheduled to be processed.

After data files are processed 48 according to the specifications of the originator, the processor creates a confirmation record 50 for the data file it processed. Confirmation records 50a are a means for later verifying that a specific data file has indeed been received from the originator and processed by the processing entity. A confirmation record 50a contains the originator's identification code 50b the sequence number of the processed data file 50c and the date in which the data file was processed 50d. Of course, the confirmation record 50a may contain any other element that can be used by a processing entity to verify that a data file has been processed.

At a second preset time, the scheduling device 23 shown in FIG. 1 triggers the confirmation device 22, also shown in FIG. 1, to perform the confirmation test 52 shown in FIG. 2. The second preset time may be calculated by computing the amount of time it takes to process data files plus the average time it takes to find and rectify errors, subtracting that total from the time the data file is scheduled to be processed. For example, if a specific originator's profile states that data files should be processed by five o'clock p.m. and it takes one (1) hour to process a data file for the respective originator and an average of thirty (30) minutes to locate and rectify errors, the second preset time should be set to trigger the confirmation test no later than three thirty p.m.

Once the scheduling device triggers the confirmation device, the confirmation test 52 begins. The confirmation device begins by analyzing the confirmation records contained in the CCR data set 20a shown in FIG. 1 and the CRH data set 20b shown in FIG. 1 to determine whether the data file of a respective originator was received and processed. After the confirmation test 52 is complete, the confirmation device determines whether the test was successful 54. If the confirmation test failed, the processing entity is delivered an error message 56 using an error notification device as will be described in further detail below.

Method of Operation of the Confirmation Device in an Embodiment

Figure 3:
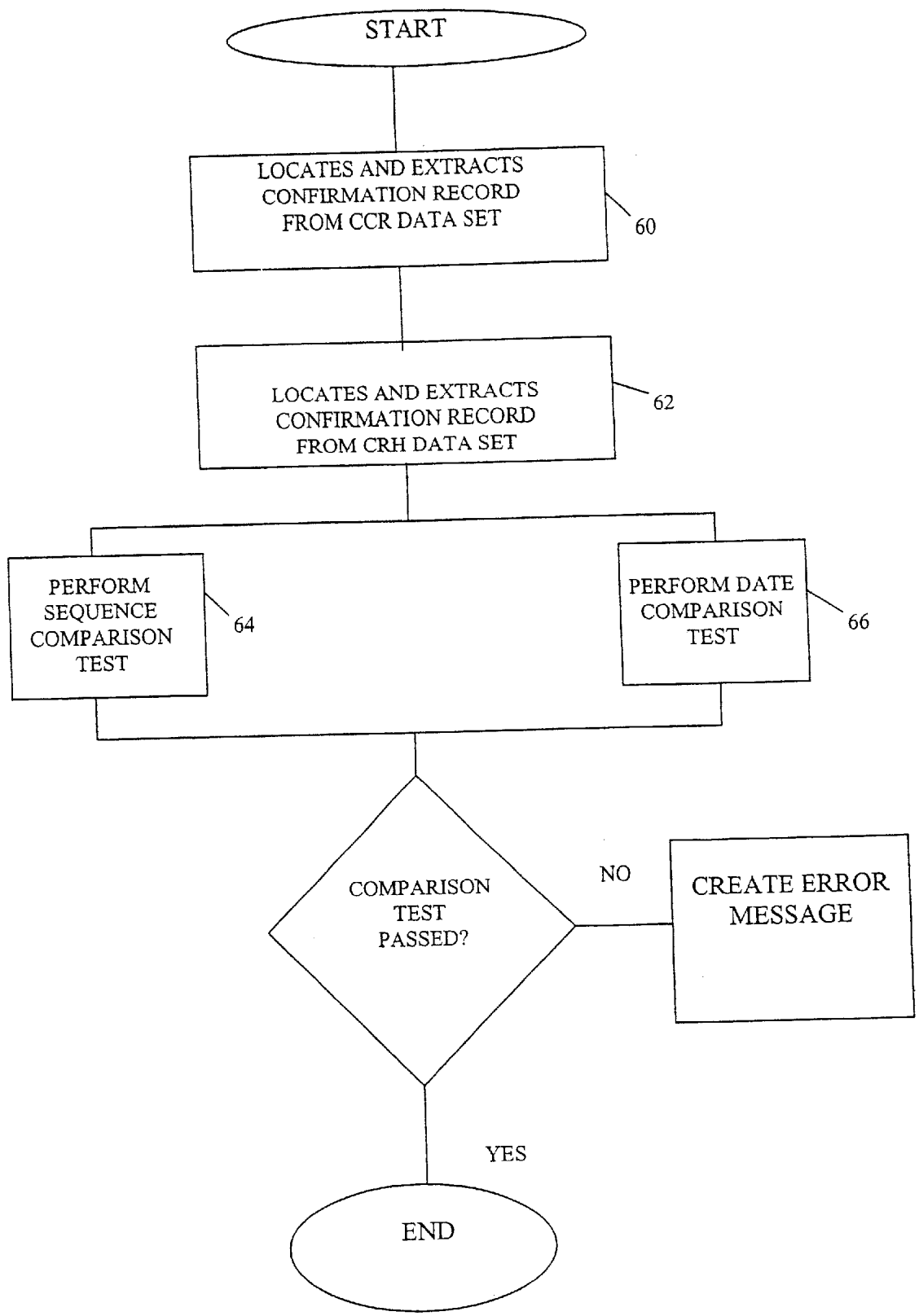
FIG. 3 is a flow diagram illustrating a method of performing a confirmation test.

FIG. 3 shows the operation of a confirmation device. First, the confirmation device scans the CCR data set and the CRH data set to locate the confirmation records of a respective originator. To locate the confirmation records of a given originator, the confirmation device uses the originator's pre-assigned unique identification code as criterion. The confirmation device searches the CCR data set and the CRH data set for most recently created confirmation records, containing a unique identification code matching the criterion. The confirmation device then extracts the contents of the confirmation record it located in the CCR data set 60 and the CRH data set 62 for the respective originator. The confirmation record in the CCR data set is a record of the most recently processed data file and the CRH data set is a record of the data file processed just prior to the most recently processed data file.

The extracted confirmation records are used in comparison tests to determine whether data files of a given originator were timely received and processed. In the preferred embodiment of this invention, the comparison test includes a sequence number comparison 64 and a process date comparison 66. Of course different comparisons may be performed to verify receipt and processing of a data file. Alternative comparisons will depend on the elements contained in the confirmation record. Furthermore, the comparisons may be performed in any order. The decision to perform the sequence number comparison 64 before the process date comparison 66 and vice versa is the processing entity's choice.

In the present embodiment of this invention, the sequence number comparison 64 is performed to determine whether the data files were processed in the correct order. The sequence comparison 64 is successful if the sequence number of the confirmation record extracted from the CCR data set is one (1) greater than the sequence number of the confirmation record extracted from the CRH data set. When the embodiment of the invention recycles sequence numbers after a maximum sequence number is reached, the sequence number comparison is successful, if the sequence number of the confirmation record extracted from the CCR data set is one (1) and the sequence number of the confirmation record extracted from the CRH data set is the maximum number in the sequence number series. Otherwise, an error has occurred in the order the data files were processed and the confirmation test failed. Generally, when the sequence number comparison 64 fails it is an indicator that a data file was received from the originator but was not processed or the originator did not submit a data file to the processing entity.

The confirmation test also involves comparing the date the data file was processed with the date the data file is scheduled to be processed 66. The date comparison 66 is performed to determine whether a data file was processed on schedule. The date comparison 66 is successful and the data file was timely processed, if the date of the confirmation record extracted from the CCR data set is equivalent to the date the data file was scheduled to be processed. Otherwise, the date comparison 66 fails and the data file has not been timely processed.

When the confirmation test fails, whether failure occurred with the sequence comparison 64 or the date comparison 66, the confirmation device creates an error message. When new error messages are created the system operator is automatically notified of the error.

Overview of a Method of Operation for Error Notification Devices

When an error message is created, the contents of the error message must be immediately routed through the appropriate network to the chosen error notification device. A computer using an electronic messaging system is the preferred error notification device because it can provide easily understandable, comprehensive information regarding the error. When an electronic mail device is used, the error report is routed to a computer through a local network 25 connected to both the processor's system and the computer. Any number of commercially available electronic mail software applications may be used to communicate error messages to the processing entity's system operator, including but not limited to, electronic mail software application designed by Microsoft, Oracle, and others. The process of contacting the appropriate network and delivering the error message to a computer using an electronic messaging system is known and will be appreciated by one skilled in the art.

While the computer using electronic messaging system is the preferred error notification device, it is not the exclusive device. The error notification device may be any device or combination of devices capable of notifying a system operator that an error has occurring in receiving and/or processing a data file. Telecommunication devices, such as telephones, both wireless and conventional, and pagers both numeric and alphanumeric may be suitable error notification devices.

Example Error Message Formats

It is preferable that the error message not only identify the originator whose data files have encountered an error, but also includes the contents of the confirmation records involved in the failed confirmation test. If the system operator is only told that an error has occurred involving originator X, the operator still has to search through the confirmation records of the respective originator in the CCR and CRH data sets before he has any idea what caused the error. However, if the operator is informed of the data contained in the confirmation records, he can quickly narrow the possible causes of the errors. For example, if the following is included in the error message,

| Originator ID Code | Sequence No. | Process Date |
|---|---|---|
| 1111 | 004 | 1/1/2000 |
| 1111 | 006 | 1/1/2000 | the system operator knows to look for the data file with sequence number 005 sent by the originator whose identification code is 1111.

Moreover, if the data file has not been processed by the scheduled due date, knowing the sequence number of the originator's last processed file tells the system operator what file to locate. For example, if a data file is scheduled to be processed by Jan. 2, 2000 and the present data is Jan 2, 2000 and the following is included in the error message,

| Originator ID Code | Sequence No. | Process Date |
|---|---|---|
| 1111 | 004 | 12/31/2000 |
| 1111 | 005 | 1/1/2000 | the system operator knows to look for a data file with sequence number 006. Likewise, if the missing file can not be found in the processing entity's system, knowing the sequence number of the missing file allows the processing entity to call the originator and specify exactly what file is needed. Thus, while it is not necessary to include all the information contained in the confirmation records involved in the confirmation test to inform the system operator of errors, there are some obvious time saving advantages to doing so.

The foregoing description of the preferred embodiments of the invention has been presented only for purpose of illustration and description and is not intended to be exhaustive or to limit the invention to the precise forms disclosed. Many modifications and variations are possible in light of the above teaching and the ordinary skill of those in the art.

The embodiments were chosen and described in order to explain the principles of the invention and their practical application so as to enable the others skilled in the art to utilize the invention and various embodiments and with various modifications as are suited to the particular use contemplated.

What is claimed is:

1. A method for verifying that data files have been timely received from an originator and processed by a processing entity, the method comprising:
   a) sending a confirmation record to the processing entity verifying that a given originator's data file has been processed;
   b) performing a confirmation test to confirm that an originator's data files have been processed in the order specified by the originator, wherein said confirmation test comprises comparing the contents of at least two confirmation records that confirm that the originator's data files were processed;
   c) generating an error message immediately following a failed confirmation test; and d) routing said error message to an error notification device accessible to an error identifier.

2. The method of claim 1 wherein the contents of said confirmation record comprises:
   a) a sequence element to identify the sequence in which the processed data file was generated by the originator;
   b) an originator identification element to identify the originator of said data file; and
   c) the date the data file is processed.

3. The method of claim 2 wherein comparing the contents of the confirmation records comprise:
   a) comparing the sequence element of at least the two most recently created confirmation records confirming that a specific originator's data files were processed; and
   b) comparing the date of the most recently created confirmation record with the date the originator has specified that a data file should be processed.

4. The method of claim 3 wherein said confirmation test fails when the sequence element of the last created confirmation record is not one increment greater than the sequence element of the second-to-last created confirmation record.

5. The method of claim 3 wherein said confirmation test fails when the date of the last created confirmation record does not equal the date at which the originator's data file is to be processed.

6. The method of claim 1 wherein said data files comprise:
   a) a data file sequence element to identify the sequence in which data files were generated by the originator; and
   b) an originator identification element to identify the originator of said data files.

7. The method of claim 6 wherein the identification element comprises a pre-assigned unique identification code.

8. The method of claim 6 wherein said data files are generation-based files in which the sequence element is automatically created, incremented and assigned to each data file generated by the originator.

9. The method of claim 1 wherein said error message comprises at least a portion of the contents of the confirmation records involved in a failed confirmation test.

10. The method of claim 1 wherein the error message comprises:
    a) the name of the originator whose data files were improperly processed;
    b) the sequence number of the confirmation records involved in the failed confirmation test; and
    c) the date of the most recently created confirmation record involved in the failed confirmation test.

11. The method of claim 1 wherein the error notification device is a computer accessible to the error identifier, said computer connected to the processing entity's system by a local network.

12. The method of claim 11 wherein the computer uses an electronic messaging system to deliver the error message to the error identifier.

13. A method for verifying that data files have been timely received from an originator and processed by a processing entity, the method comprising:
    a) creating a confirmation record confirming that a data file has been processed wherein said confirmation record comprises an originator identification element, a data file sequence element, and the date the data file was processed;
    b) locating at least the two most recently created confirmation records;
    c) performing a confirmation test using said confirmation records; if the confirmation test fails, generating an error message to inform the processing entity that an error has occurred with receiving or processing the data files of the originator; and
    d) routing said error message to a error notification device accessible to an error identifier.

14. The method of claim 13 wherein the originator identification element is a pre-assigned identification code unique to a given originator.

15. The method of claim 13 wherein said confirmation test comprises:
    a) comparing the sequence element of at least the two most recently created confirmation records confirming that a specific originator's data files were processed; and
    b) comparing the date of the most recently created confirmation record with the date the originator has specified that a data file should be processed.

16. The method of claim 15 wherein said confirmation test fails when the sequence element of the last created confirmation record is not one increment greater than the sequence element of the second-to-last created confirmation record.

17. The method of claim 15 wherein said confirmation test fails when the date of the last created confirmation record does not equal the date at which an originator's data file is to be processed.

18. The method of claim 13 wherein said data files are generation-based files in which a sequence element is automatically created, incremented and assigned to each data file generated by the originator.

19. The method of claim 13 wherein said error message comprises at least a portion of the contents of the confirmation records involved in a failed confirmation test.

20. The method of claim 13 wherein the error message comprises,
    a) the name of the originator whose data file were not proper processed;
    b) the sequence number of confirmation records involved in the failed confirmation test; and
    c) the date of the last created confirmation record involved in the failed confirmation test.

21. The method of claim 13 wherein the error notification device is a computer accessible to the error identifier, connected to the processing entity's system by a local network.

22. The method of claim 21 wherein the computer uses an electronic messaging system to deliver the error message to the error identifier.

23. A system for verifying that a data file has been received and processed, the system comprising:
    a) sending a confirmation record to the processing entity verifying that a given originator's data file has been processed;
    b) performing a confirmation test to confirm that an originator's data files have been processed in the order specified by the originator, wherein said confirmation test comprises comparing the contents of at least the two confirmation records that confirm that the originator's data files were processed;
    c) generating an error message immediately following a failed confirmation test;
    d) routing said error message to an error notification device accessible to an error identifier.

24. A system for verifying that a data file has been timely received and processed, the system comprising:
   a) a data storage and retrieval device operative:
      i. to store confirmation records confirming that data files have been processed; and
      ii. to store software applications and devices used to locate, create and manipulate data files stored on the data storage and retrieval device;
   b) a confirmation device operative:
      i. to locate said confirmation records based on at least one criterion in a set of criteria;
      ii. to analyze said confirmation records to determine the sequence in which data files were processed and the date data files were processed;
      iv. based on said analysis, to determine whether an error occurred in timely receiving and processing data files; and
   c) an error notification device operative:
      i. to communicate an error message to an error identifier immediately after said error message is created.

25. The system of claim 24 further comprising a scheduling device operative to trigger the performance of activities on the data storage and retrieval device at preset times.

26. The system of claim 24 wherein said confirmation device locates said confirmation records using a unique identification code pre-assigned to an originator.

27. The system of claim 24 wherein the functions of the confirmation device comprise:
   a. locating at least the two most recently created confirmation records using a unique identification code pre-assigned to a given originator;
   b. comparing the sequence element of the most recently created confirmation record with the sequence element of the second-to-last created confirmation record;
      if the sequence element of the most recently created confirmation record is not one increment greater then the sequence element of the second-to-last created confirmation record, creating an error message;
   c. comparing the date of the last created confirmation record with the date at which the originator's data file is to be processed;
      if the date of the last created confirmation record does not equal the date at which the originator's data file is to be processed, creating an error message.

28. The system of claim 24 wherein the error message contains the contents of the confirmation records analyzed by the confirmation device.

29. The system of claim 24 wherein the error notification device is a computer using an electronic messaging system connected to the processing entity's system through a local network.

* * * * *